(12) United States Patent
Cowart et al.

(10) Patent No.: US 10,723,961 B2
(45) Date of Patent: Jul. 28, 2020

(54) SYSTEM FOR PRODUCING AN AMERICAN PETROLEUM INSTITUTE STANDARDS GROUP III BASE STOCK FROM VACUUM GAS OIL

(71) Applicant: Vertex Energy, Houston, TX (US)

(72) Inventors: Benjamin Cowart, Houston, TX (US); David Peel, Houston, TX (US); Frank Lappin, Homewood, IL (US); James Craig Smith, Columbus, OH (US)

(73) Assignee: VERTEX ENERGY, Houston, TX (US)

( * ) Notice: Subject to any disclaimer, the term of this patent is extended or adjusted under 35 U.S.C. 154(b) by 0 days.

(21) Appl. No.: 16/540,977

(22) Filed: Aug. 14, 2019

(65) Prior Publication Data
US 2019/0367821 A1    Dec. 5, 2019

Related U.S. Application Data (63) Continuation-in-part of application No. 16/201,070, filed on Nov. 27, 2018, now Pat. No. 10,421,916.

(60) Provisional application No. 62/593,030, filed on Nov. 30, 2017, provisional application No. 62/593,002, filed on Nov. 30, 2017.

(51) Int. Cl.
```
C10G 49/22      (2006.01)
B01J 8/04       (2006.01)
B01D 19/00      (2006.01)
B01D 3/14       (2006.01)
```
(Continued)

(52) U.S. Cl.
CPC ............ *C10G 49/22* (2013.01); *B01D 3/143* (2013.01); *B01D 19/0036* (2013.01); *B01J 4/002* (2013.01); *B01J 8/0492* (2013.01); *B01J 8/0496* (2013.01); *B01J 2204/007* (2013.01); *B01J 2208/00168* (2013.01)

(58) Field of Classification Search
CPC ....... C10G 49/22; B01J 8/0492; B01J 8/0496; B01J 4/002; B01J 2204/007; B01J 2208/00168; B01D 19/0036; B01D 3/143; B01D 3/42; B01D 3/009; B01D 3/06; B01D 3/10
See application file for complete search history.

(56) References Cited

U.S. PATENT DOCUMENTS 6,787,026 B2 *  9/2004  Farshid ................. C10G 65/12
                                                    208/100

\* cited by examiner

*Primary Examiner* — Randy Boyer
*Assistant Examiner* — Juan C Valencia
(74) *Attorney, Agent, or Firm* — Nolte Intellectual Property Law Group (57) ABSTRACT

A system for producing American Petroleum Institute Standards Group III Base Stock from vacuum gas oil, by injecting hydrogen, heating, partially saturating the vacuum gas oil through a plurality of hydrogen reactors connected in series with a liquid hourly space velocity $(LHSV)^{-1}$ of from 0.5 to 2.5, forming a saturated heated base oil, and coproduct. The system fractionates the saturated heated base oil to while simultaneously refluxing a cooled fuel oil fraction forming an American Petroleum Institute Standards Group III Base Stock with less than 0.03% sulfur, with greater than 90% saturates and a viscosity index greater than 120 as defined by ASTM D-2270, a viscosity from 2 to 10 centistokes as defined by ASTM D-445 a boiling range from 600 degrees F. to 1050 degrees F., and a cold crank viscosity (CCS) between 1200 and 5000 centipoise at −25 degrees C. and as defined by ASTM D-5293.

5 Claims, 6 Drawing Sheets

(51) Int. Cl.
*B01J 4/00* (2006.01)
*C10G 65/02* (2006.01)

SYSTEM FOR PRODUCING AN AMERICAN PETROLEUM INSTITUTE STANDARDS GROUP III BASE STOCK FROM VACUUM GAS OIL

CROSS REFERENCE TO RELATED APPLICATIONS

The application claims the benefit of related patent application of U.S. patent application Ser. No. 62/593,002 titled "System for producing an American Petroleum Institute Standards Group III Base Stock from vacuum gas oil" and U.S. patent application Ser. No. 62/593,030 titled "Method for Producing an American Petroleum Institute Standards Group III Base Stock from vacuum gas oil" both filed Nov. 30, 2017 and non-provisional patent application Ser. No. 16/201,248 now an issued U.S. Pat. No. 10,287,515 and allowed non-provisional patent application Ser. No. 16/201,070. All of these references are hereby incorporated herein in their entirety for all purposes to the extent they are consistent with the present disclosure.

FIELD

The present embodiment generally relates to a system for producing an American Petroleum Institute Standards Group III Base Stock from vacuum gas oil.

BACKGROUND

A need exists for a system for producing an American Petroleum Institute Standards Group III Base Stock from vacuum gas oil derived from used motor oil and other used oils The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

The invention teaches a system of producing an American Petroleum Institute Standards Group III Base Stock from used oil in the form of vacuum gas oil.

The embodiments may enable an increase in inventory of American Petroleum Institute Standards Group III Base Stock.

The embodiments may save lives because re-refining reduces unnecessary air pollution caused by burning used oil in space heaters which are not adequately maintained.

The embodiments may reduce environmental pollution by providing a safe and responsible way to manage used oils. One gallon of used oil can contaminate over one million gallons of drinking water. Additionally, re-refining used oil requires between 50%-80% less energy to produce base oil compared to conventional production from crude oil.

The embodiments may reduce dependence on fossil fuel because used oil can be beneficially re-refined to produce high-purity base oil fit for original purpose.

The embodiments may create a base oil for high performance engines to yield better fuel economy and lower emissions of Green House Gases and particulate matter. The resultant improvement in ambient air quality reduces negative health impacts, especially to the most vulnerable population—older citizens and young children.

The embodiments may increase inventory of American Petroleum Institute Standards Group III Base Stock.

The embodiments may reduce pollution to the improper disposal of used oil into ground water. 1 gallon of used oil can contaminate 1 million gallons of drinking water.

Before explaining the present system in detail, it is to be understood that the system is not limited to the particular embodiments and that it can be practiced or carried out in various ways.

The invention relates to a system for producing an American Petroleum Institute Standards Group III Base Stock from vacuum gas oil by four equipment arrangements.

In all four sequences, hydrogen is injected using two different injectors into a plurality of reactors with catalyst. The hydrogen increases pressure on the vacuum gas oil to between 1000 psig and 1500 psig.

A series of heaters are used to increase temperature of the vacuum gas oil to 600 degrees Fahrenheit, saturating the vacuum gas oil completely using an inverse liquid hourly space velocity $(LHSV)^{-1}$ through the hydrogen reactors from 0.5 to 2.5, forming a saturated heated base oil, a coproduct and contaminants.

A fractionation tower receives and fractionates the heated partially saturated heated base oil to remove a light oil fraction with a boiling point of less than 600 degrees Fahrenheit while simultaneously refluxing a cooled light oil fraction during fractionating, forming an American Petroleum Institute Standards Group III Base Stock with less than 0.03 percent sulfur, greater than 90 percent saturates and a viscosity index greater than 120 as defined by ASTM D-2270 and a viscosity range from 2 centistokes to 10 centistokes as defined by ASTM D-445 with a boiling range from 600 degrees Fahrenheit to 1050 degrees Fahrenheit as defined by ASTM D-86, and a cold crank viscosity (CCS) from 1200 to 5000 centipoise at minus 25 degrees Celsius and as defined by ASTM D-5293.

Hydrogen is injected using two different injectors into the vacuum gas oil increasing pressure on the vacuum gas oil between 1000 psig and 1500 psig.

A plurality of heaters are used to increase temperature to 450 degrees Fahrenheit and 1200 psig in the hydrogen reactors, partially saturating the vacuum gas oil through a plurality of hydrogen reactors connected in series having a liquid hourly space velocity $(LHSV)^{-1}$ through the hydrogen reactors from 0.5 to 2.5, forming a fully saturated heated base oil a coproduct and contaminants.

The following terms are used herein:

ASTM D445-17a: American Society for Testing and Materials (ASTM) D445-17(a) published on May 1, 2017 is the standard method for testing kinematic viscosity of petroleum products both transparent and opaque liquids. Results are reported in cPs at 40° C. and 100° C.

ASTM D-2270-10: American Society for Testing and Materials (ASTM) D 2270-10 published on Jan. 1, 2016 is the standard method for calculating viscosity index (VI) of petroleum products from kinematic viscosities reported at 40° C. and 100° C.

ASTM D5293-17a: American Society for Testing and Materials (ASTM) D5293-17(a) published on Oct. 1, 2017 is the standard test to determine the apparent viscosity of engine oils and base oils at temperatures between minus 5° C. and minus 35° C. at high shear rates. Reported as dynamic or absolute viscosity, centipoise (cP).

ASTM D86-18: American Society for Testing and Materials (ASTM) D86-17 published on May 1, 2017 is the standard test to determine the distillation range of Petroleum Products and Liquid Fuels at Atmospheric pressure.

The term "conduit" as used herein is a channel for conveying fluids.

The term "Cold Crank Simulation" refers to a method used to determine the low temperature performance of lubricants, when starting a cold engine (i.e., cold-cranking, which physical property is termed "cold crank viscosity").

The term "contaminants" as used herein can comprise aromatics as well as compounds containing sulfur, nitrogen and chlorine, such as hydrogen sulfide ($H_2S$), ammonia ($NH_3$) or hydrochloric acid (HCL).

The term "control meters" are precision made liquid measuring instruments that maintain precise and accurate metering of fluids.

The term "control valve" is a valve used to control fluid flow by varying the size of the flow passage as directed by a signal from a controller. This permits the direct control of flow rate and the consequential control of process quantities such as pressure, temperature, and liquid level.

The term "coproduct" as used herein can refer to a saleable, light oil fraction created during the saturation of the heated vacuum gas oil. The term "Group III base stock" is defined by the American Petroleum Institute as a base stock that is greater than 90 percent saturates, less than 0.03 percent sulfur and has a viscosity index above 120.

The term "cracked gas" as used herein refers the small percentage of very light hydrocarbons, usually existing in a gaseous form, which are a result of the breakdown of more complex, long-chain hydrocarbons such as vacuum gas oil and saturated, heated base oil.

The term "demetalizing catalyst" refers to a catalyst designed to selectively reduce specific metals such as phosphorous which may otherwise deposit on downstream catalysts, poisoning the active sites.

The term "flash drum" is a vessel used to separate a vapor-liquid mixture. A flash drum may also be referred to as a vapor-liquid separator, breakpot, knock-out drum or knock-out pot, compressor suction drum. It can operate at high pressure or low pressure.

The term "fractionation tower" is an item used in distillation of liquid mixtures so as to separate the mixture into its component parts, or fractions, based on the differences in volatilities.

The term "fuel oil fraction" as used herein can refer to a light hydrocarbon, such as kerosene.

The term "fully saturated heated base oil" refers to refers to a hydrocarbon chain that has been heated and has had the double and triple bonds between its carbon atoms greater than 98% fully broken and replaced with single bonds and hydrogen atoms.

The term "heater" and/or "heating system" as used herein refers to the system or device that produces and radiates heat to raise the temperature of a liquid, gas or mixture. Examples may include direct fired heaters, heat exchangers of various styles, feed effluent heat exchangers, hot oil heaters, heater coils and such.

The term "heating the vacuum gas oil" as used herein can refer to increasing an initial temperature of the vacuum gas oil to at least 450 degrees, such as using an exchanger or a direct fired heater.

The term "hydrogen compressor" is a mechanical device that increases the pressure of hydrogen gas by reducing its volume.

The term "hydrogen reactor" as used herein is a pressure vessel in which hydrogen is used in a catalytic chemical process to remove contaminants such as sulfur and nitrogen from refined petroleum products, such as vacuum gas oil.

The term "hydrogen vaporizer" is a device which vaporizes liquid hydrogen.

The term "initial boiling point" as used herein can refer to the recorded temperature of the first drop of distilled vapor that is condensed and falls from the end of a condenser during distillation as defined by ASTM D-86.

The term "injector" is a mechanical device that assists in the increases in the pressure of a gas by reducing its volume.

The term "light oil fraction" as used herein can refer to a light hydrocarbon, such as kerosene.

The term "liquid hourly space velocity" is defined as the hourly feed rate flow divided by the volume of catalyst.

The term "liquid hydrogen" is the liquid (cryogenic) state of the element hydrogen.

The term "metallic catalyst" is a substance that contains various metals such as nickel, cobalt, molybdenum which are usually supported on a metal oxide base. Catalysis is the process of increasing the rate of a chemical conversion by adding a substance known as a catalyst, which is not consumed in the catalyzed reaction and can continue to act repeatedly. Different metal combinations may be used to achieve the desired reaction.

The term "naphtha" is a distillation product boiling in the approximate range 100-200 C and containing aliphatic hydrocarbons: Naphtha is found as a component of solvents, as well as Kerosene and Gasoline.

The term "plurality of hydrogen reactors" as used herein can refer to two or more hydrogen reactors, such as from 2 to 6 hydrogen reactors connected in series with increasing temperature in each hydrogen reactor. Each hydrogen reactor can have a "reactor volume". The reactor volume can be the expressed quantity in cubic feet of catalyst that is contained by the hydrogen reactor for each of the plurality of hydrogen reactors. In some examples, the plurality of hydrogen reactors can each have identical reactor volumes.

The term "recycle nozzle" is a device which injects recycled hydrogen into a conduit.

The term "recycle overhead" refers to a recycled hydrogen stream.

The term "refluxing" as used herein can refer to a technique involving the condensation of vapors and the return of condensate to the system from which it originates.

The term "random packed tower" is a distillation tower (or column) that has both trays and packed section internals. This could be 4 trays and 3 packed sections The term "saturates" means the fraction that consists of nonpolar material including linear, branched, and cyclic saturated hydrocarbons (paraffins).

The term "partially saturated heated base oil" refers to a hydrocarbon chain that has been heated and has had less than 98% of the double and triple bonds between its carbon atoms broken and replaced with single bonds and hydrogen atoms.

The term "saturating the heated vacuum gas oil" as used herein can refer to removing at least 90 percent of aromatic hydrocarbons, and aromatic alkanes, including toluene, xylene, and benzene.

The term "turbulent flow" is defined as flow of a fluid in which its velocity at any point varies rapidly in an irregular manner.

The term "used oil" as used herein can refer to any oil, which is synthetic oil or derived from crude oil, that has undergone a process, such as use in an engine, machine or any other device, which breaks down the properties of the oil during heating and mechanical operation. A used oil can be an oil used as a lubricant, a coolant or a heat transfer media.

The term "vacuum gas oil" as used herein can refer to oils purified by vacuum distillation process. This definition refers to used oils.

The term "velocity" is a measure of the rate of motion of a body expressed as the rate of change of its position in a particular direction with time. It is measured in meters per second, miles per hour or feet per second.

The term "viscosity" is a measure of an oil's resistance to flow. Viscosity governs the sealing effect of oils and the rate of oil consumption, as well as determines the ease with which machines may be started or operated under varying temperature conditions, particularly in cold climates.

The term "viscosity index" as used herein can refer to the rate of change of a fluid's viscosity with changes with temperature as defined by ASTM D-2270.

The term "water cooled exchanger/cooling water exchanger" is a cooling system to remove heat from processes or equipment. Heat removed from one medium is transferred to another medium, or process fluid. Most often, the cooling medium is water.

The system disclosed herein for producing an American Petroleum Institute Standards Group III Base Stock from vacuum gas oil has a conduit receiving a vacuum gas oil with a boiling point range from 450 degrees F. to 1050 degrees Fahrenheit as defined by ASTM D-86.

The system has a first heater fluidly connected to the conduit and to a first hydrogen reactor for increasing temperature of the vacuum gas oil to a temperature from 450 degrees Fahrenheit to 600 degrees F., forming a heated vacuum gas oil.

The system uses a pump installed prior to the first heater, a fresh hydrogen injector and a recycle hydrogen injector simultaneously increasing pressure on the heated vacuum gas oil from 50 psig to a pressure from 1000 psig and to 1500 psig by injection of hydrogen.

The fresh hydrogen injector has a nozzle that engages a flow control valve further in communication with a flow meter and a high-pressure pump and a hydrogen vaporizer for receiving liquid hydrogen from a liquid hydrogen reservoir.

The system includes a plurality of hydrogen reactors connected in series.

Each hydrogen reactor has a liquid hourly space velocity $(LHSV)^{-1}$ through the series of hydrogen reactors from 0.5 to 2.5, for saturating the heated vacuum gas oil and to form a partially saturated heated base oil. Each hydrogen reactor is connected to a heater.

Specifically, the system includes a fourth heater fluidly connected to a fourth hydrogen reactor for increasing temperature of the partially saturated heated base oil with hydrogen to a temperature from 600 degrees Fahrenheit to 800 degrees Fahrenheit, forming a fully saturated base oil.

The system includes a high-pressure flash drum connected to the fourth hydrogen reactor forming (i) a recycle overhead at a high pressure from 1000 psig to 1500 psig, (ii) a fully saturated base oil, (iii) contaminants, and (iv) a coproduct at a high pressure from 1000 psig to 1500 psig.

The system includes a low-pressure flash drum removing contaminants from the fully saturated heated base oil producing contaminant free saturated heated base oil.

The system includes a fractionation tower that receives contaminant free fully saturated heated base oil and steam to remove a light oil fraction with an initial boiling point less than 600 degrees F. while simultaneously refluxing, forming an API Standards Group III Base Stock with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) between 1200 and 5000 centipoise at minus 25 degrees C. and as defined by ASTM D-5293.

In embodiments of the system, a feed effluent heat exchanger is used to exchange energy from the American Petroleum Institute Standards Group III Base Stock is with the feedstock vacuum gas oil reducing temperature of the American Petroleum Institute Standards Group III base stock from 500 degrees Fahrenheit to 300 degrees Fahrenheit.

In other embodiments of the system a cooling water exchanger is used to receive warm American Petroleum Institute Standards Group III Base Stock from the feed effluent heat exchanger and reduces the temperature by 100 degrees Fahrenheit to 150 degrees Fahrenheit and then transfers the cooled American Petroleum Institute Standards Group III Base Stock to storage or transport.

The system can use a metallic catalyst installed in each of the hydrogen reactors.

The metallic catalyst can be selected from at least one of the group cobalt, nickel, and molybdenum. Each reactor can have a different metallic catalyst.

Embodiments of the system include a recycle hydrogen injector that has a recycle nozzle; a recycle flow meter connected to the recycle nozzle in series; a hydrogen compressor connected to the recycle flow meter; a second stage knockout drum separating contaminated water; a first stage knockout drum separating contaminated water and naphtha; a water cooled exchanger; a high-pressure wash water injector providing a psig from 1400 to 1600 psig receiving water; and a recycle overhead connected to the high-pressure wash water injector.

Turning now to the Figs., FIG. 1-FIG. 3 and FIG. 6 are diagrams of the overall system for the production of American Petroleum Institute Standards Group III base stock 113 from vacuum gas oil.

Each of the systems in FIG. 1-FIG. 3 and FIG. 6 uses a fresh hydrogen injector for injecting hydrogen into the vacuum gas oil and raising pressure in the conduit to maintain a pressure between 1000 psig and 1500 psig.

Each system also uses a recycle hydrogen injector introducing recycle hydrogen at an elevated pressure and raising pressure in the conduit to maintain a pressure between 1000 psig and 1500 psig on the vacuum gas oil.

Each system can have a conduit 10. The conduit 10 receives a vacuum gas oil 22 derived from used oil forming a vacuum gas oil 24 with a combined boiling point range from 450 degrees Fahrenheit to 1050 degrees Fahrenheit.

A first heater 30 can be fluidly connected to the conduit 10 and to a first hydrogen reactor 32 for increasing temperature on the vacuum gas oil 24 to 450 degrees Fahrenheit and to a pressure of 1200 psig partially saturating the vacuum gas oil 24 in embodiments, prior to the first heater 30, a pump 25 transfers vacuum gas oil 24 to the first heater.

A heated vacuum gas oil 19 is shown positioned right above the first heater 30.

A first hydrogen reactor 32 creates a partially saturated heated base oil 34. A second heater 40 can be fluidly connected to the first hydrogen reactor 32, and a second hydrogen reactor 42 can further increase temperature of the partially saturated heated base oil 34.

A third heater 50 can be fluidly connected to the second hydrogen reactor 42 and to a third hydrogen reactor 52, increasing temperature to a third temperature of 600 degrees Fahrenheit and to a third pressure of 1000 psig forming a saturated heated base oil 134.

A fourth heater 150 can be fluidly connected to the third hydrogen reactor 52 and to a fourth hydrogen reactor 160, increasing temperature to a fourth temperature between 600-800 degrees Fahrenheit.

In embodiments, a high-pressure flash drum 60 can be connected to the third hydrogen reactor 52 for separating contaminants from the saturated heated base oil 62 and coproduct 64 at a high pressure from 1000 psig to 1500 psig.

A recycle overhead 55 can be connected to the high-pressure flash drum 60, receiving high pressure recycle hydrogen and contaminants separated from the saturated heated base oil in the high-pressure flash drum.

A low-pressure flash drum 70 can be connected to the high-pressure flash drum 60.

The low-pressure flash drum 70 can have a psig from 40 psig to 60 psig decreasing pressure and temperature on the saturated heated base oil 62 and coproduct 64 removing contaminants 63.

Figure 1:
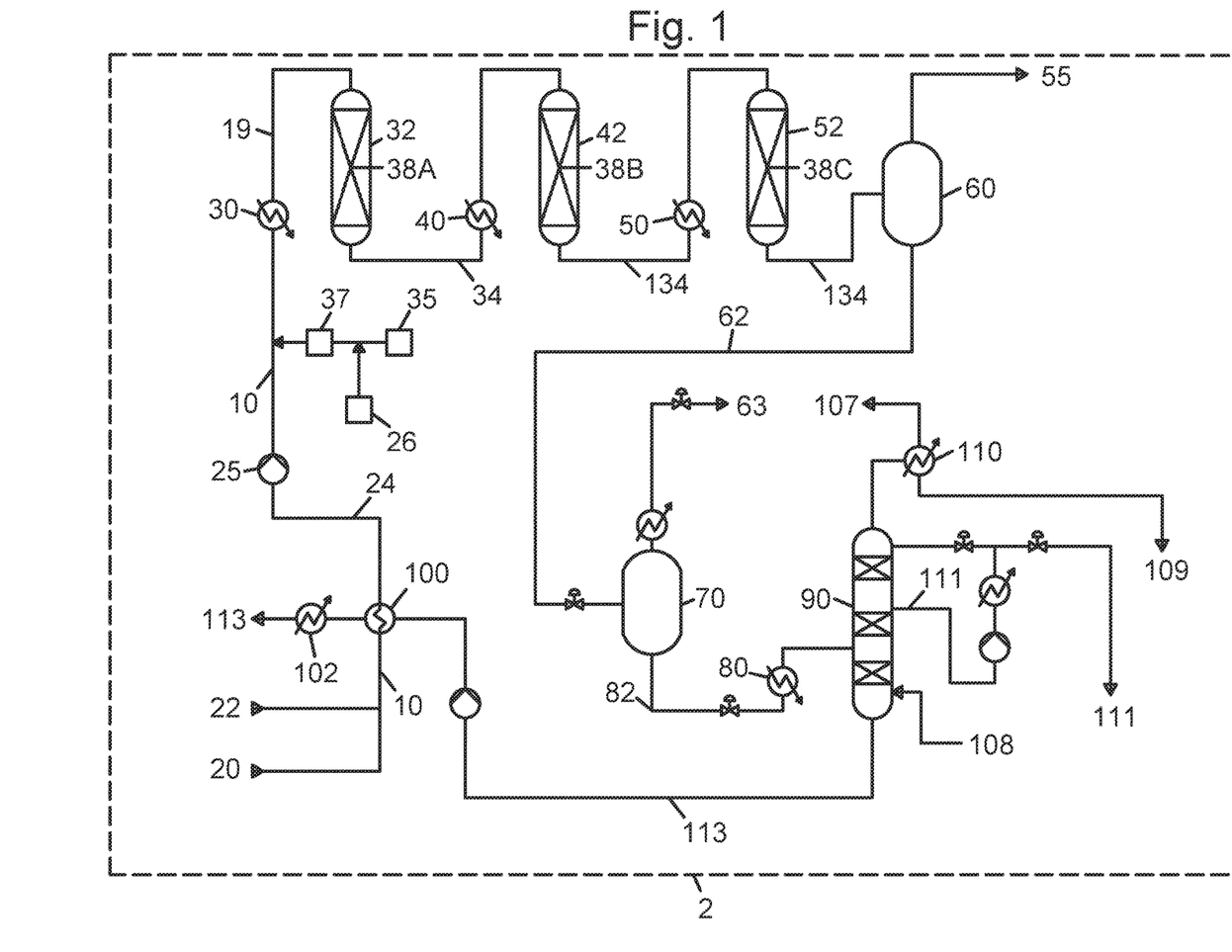
FIG. 1 is a diagram of the overall system for the production of American Petroleum Institute Standards Group III base stock from used oil.
Figure 2:
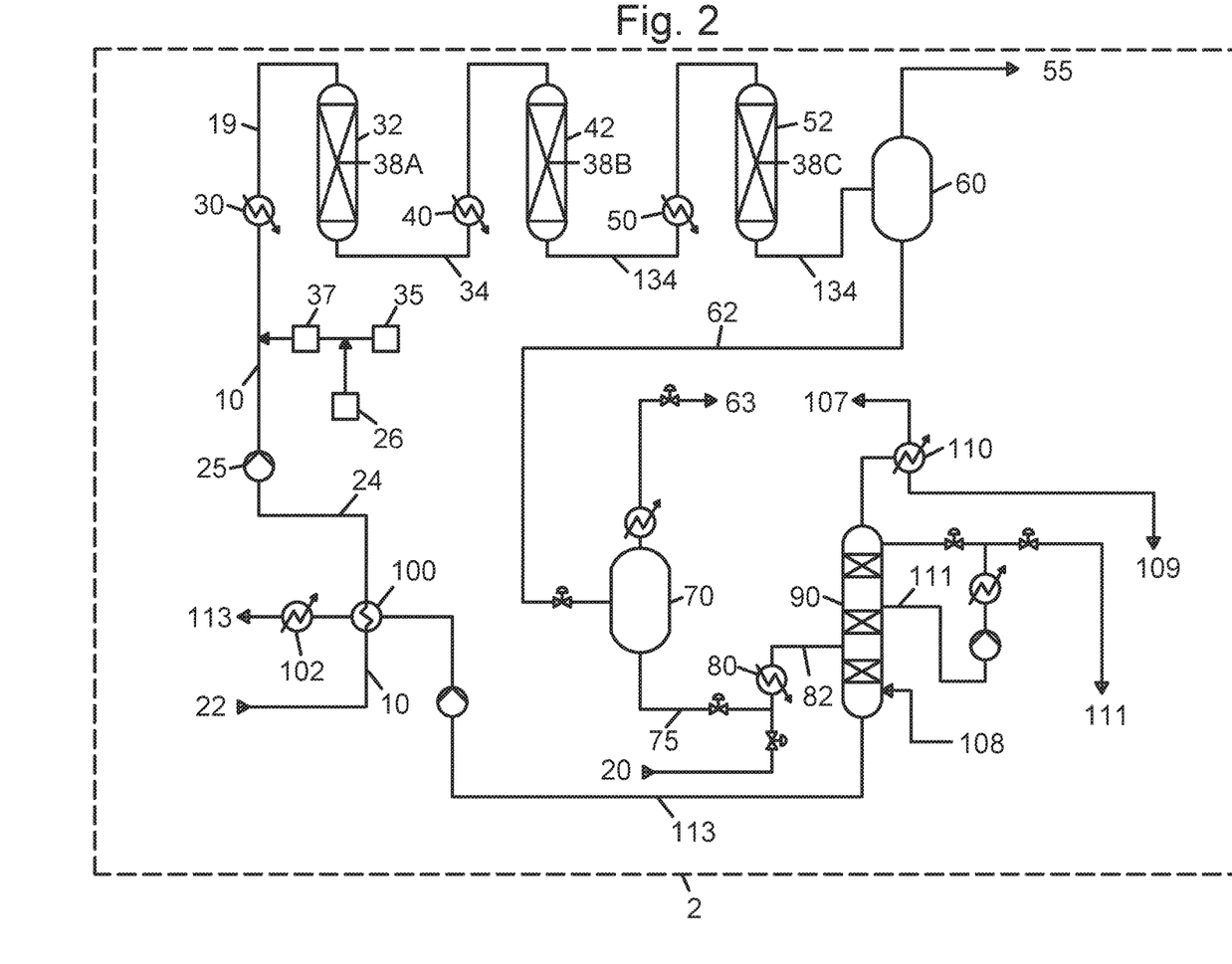
FIG. 2 is a diagram of another embodiment of the overall system for producing American Petroleum Institute Standards Group III base stock from used oil.
Figure 3:
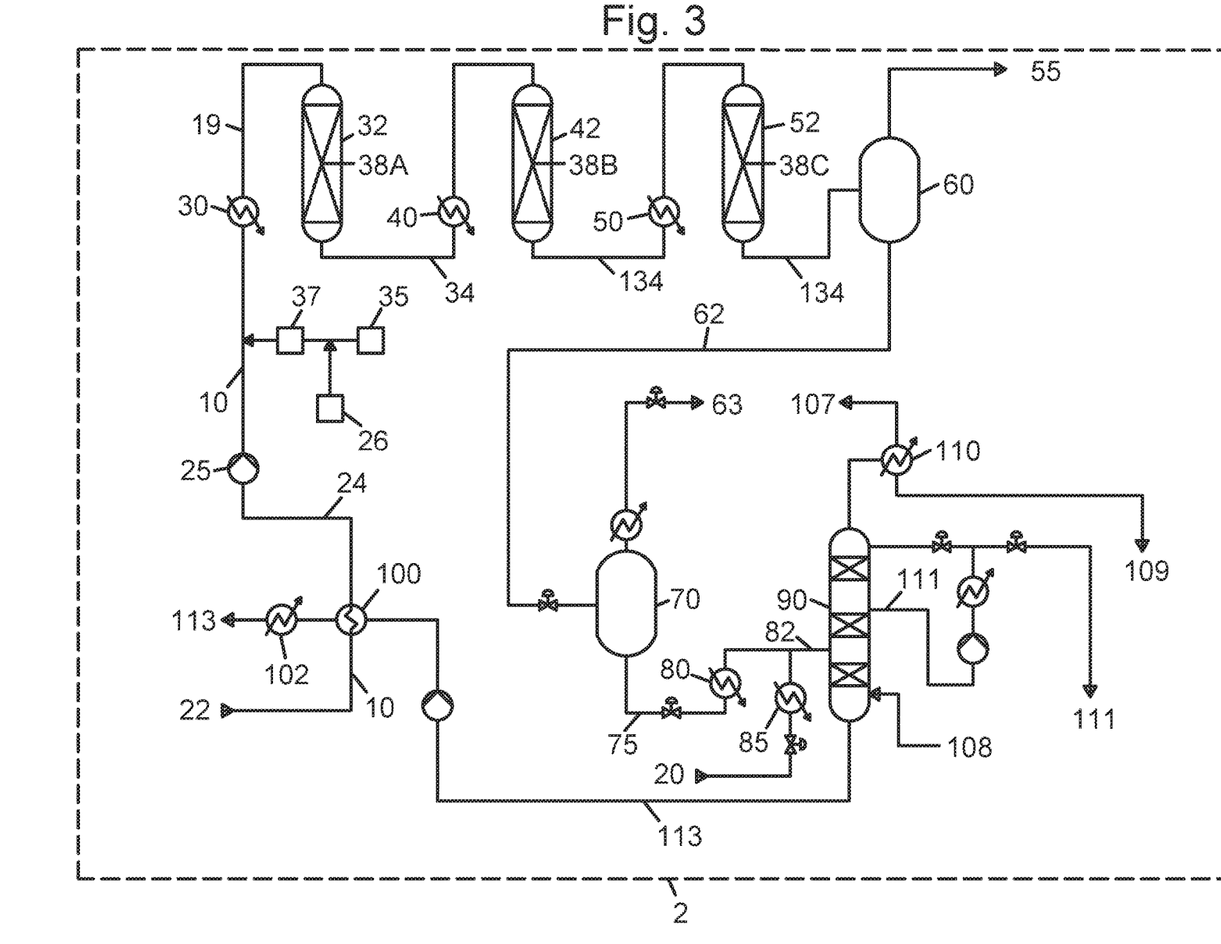
FIG. 3 is a diagram of yet another embodiment of the overall system for producing American Petroleum Institute Standards Group III base stock from used oil.

An additional heater 80 can be fluidly connected to the low-pressure flash drum 70 for heating the saturated heated base oil 62 and coproduct 64 forming a contaminant free saturated heated base oil 82, which is shown in FIGS. 1, 3 and 7, having a boiling point from 600 degrees F. to 1050 degrees Fahrenheit as determined by ASTM D-86.

FIGS. 1-3 and 6 show a fractionation tower 90 a fractionation tower 90 receives contaminant free saturated heated base oil 82 and steam 108 to remove a light oil fraction 111 with an initial boiling point less than 600 degrees F. while simultaneously refluxing a cooled light oil fraction 111 during fractionating forming an American Petroleum Institute Standards Group III Base Stock 113 with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) from 1200 to 5000 centipoise at −25 degrees C. and as defined by ASTM D-5293.

The fractionation tower 90 removes steam 108 and a cracked gas 107.

The steam 108 flow out of the fractionation tower and is condensed in a condenser 110 into steam condensate 109.

In embodiments, energy from the American Petroleum Institute Standards Group III Base Stock is exchanged with the feedstock vacuum gas oil reducing temperature of the American Petroleum Institute Standards Group III base stock from 500 degrees Fahrenheit to 300 degrees Fahrenheit using a feed effluent heat exchanger 100.

A cooling water exchanger 102 receives warm American Petroleum Institute Standards Group III Base Stock 113 from the feed effluent heat exchanger 100 and reduces temperature from 300 degrees Fahrenheit to 150 degrees Fahrenheit, before transfer to storage or transport.

In embodiments, each hydrogen reactor increases the fluid contained therein in temperature at least 5 percent.

Figure 6:
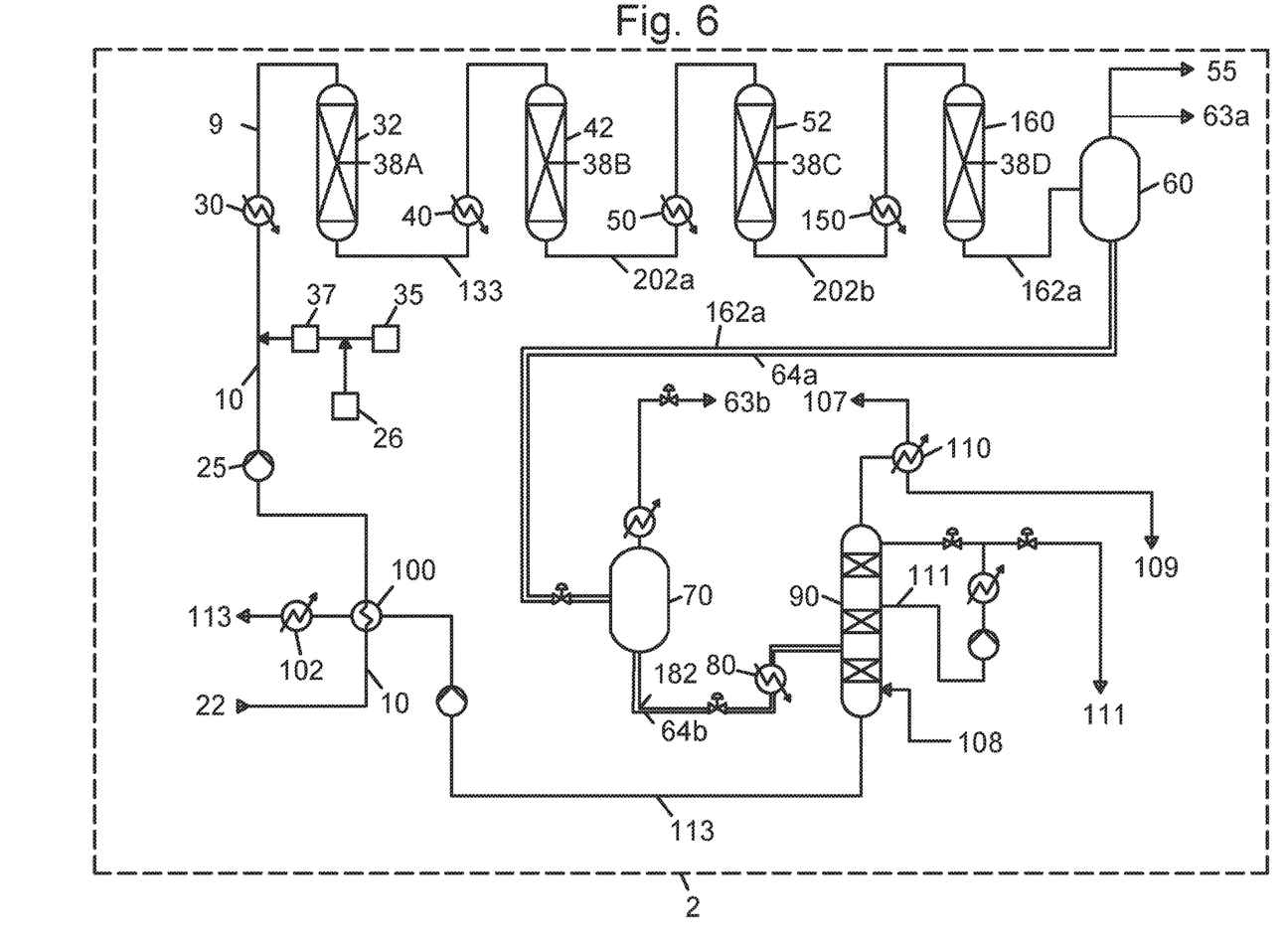
FIG. 6 is a diagram of another embodiment of the overall system for producing American Petroleum Institute Standards Group III base stock from used oil.

In embodiments, a metallic catalyst 38a-38c and, in FIG. 6, 38d can be inserted in each of the hydrogen reactors, wherein the metallic catalyst is selected from at least one of the group consisting of: cobalt, nickel, and molybdenum.

In embodiments, high-pressure flash drums or low pressure-flash drums can be used for separation.

Also shown in FIGS. 1-3 and 6 are a recycle nozzle 37, a recycle hydrogen injector 35, and a fresh hydrogen injector 26.

Figure 4:
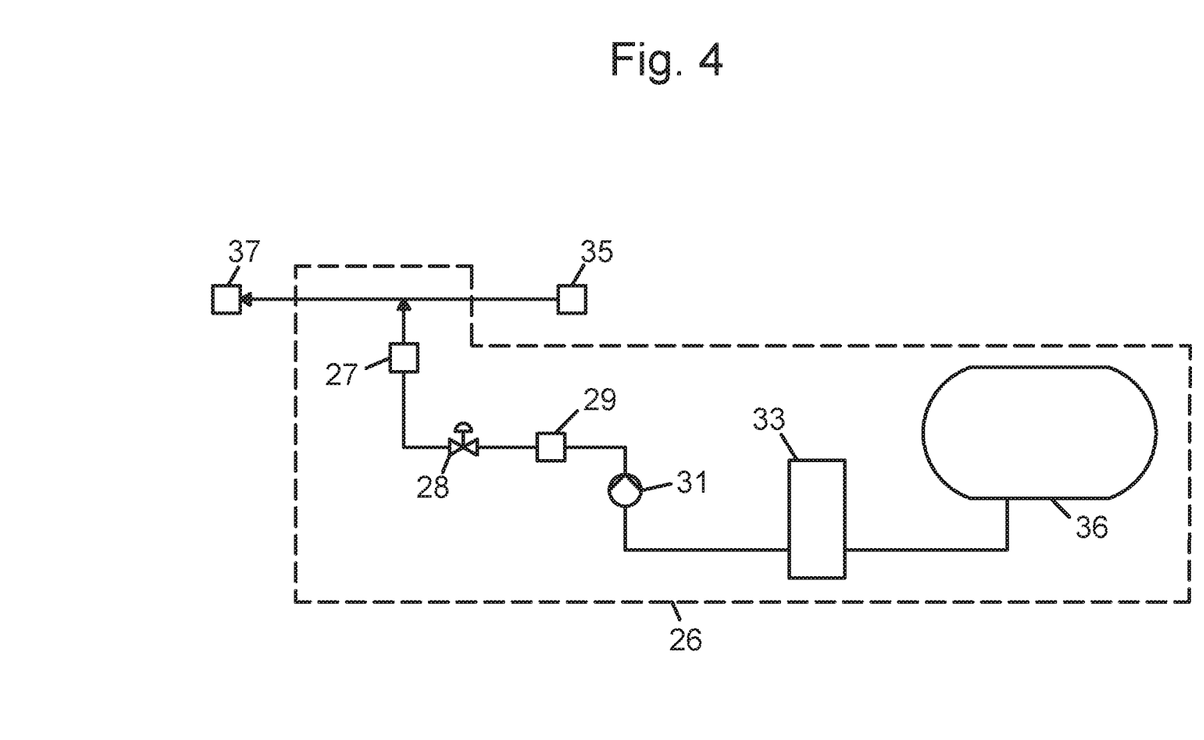
FIG. 4 is a diagram of the fresh hydrogen injector also generally shown in FIGS. 1-3 and 6.

FIG. 4 a diagram of the fresh hydrogen injector 26 shown generally in FIGS. 1-3 and 7.

A fresh hydrogen injector 26 can inject hydrogen and raise pressure in the conduit 10 to maintain between 1200 psig and 1500 psig on the vacuum gas oil 24.

The fresh hydrogen injector 26 includes a nozzle 27 that engages a flow control valve 28 that is further in communication with a flow meter 29 and a high-pressure pump 31 and a hydrogen vaporizer 33 for receiving liquid hydrogen from a liquid hydrogen reservoir 36.

In embodiments, a recycle flow meter 39 can be connected to the recycle nozzle 37 in series.

Figure 5:
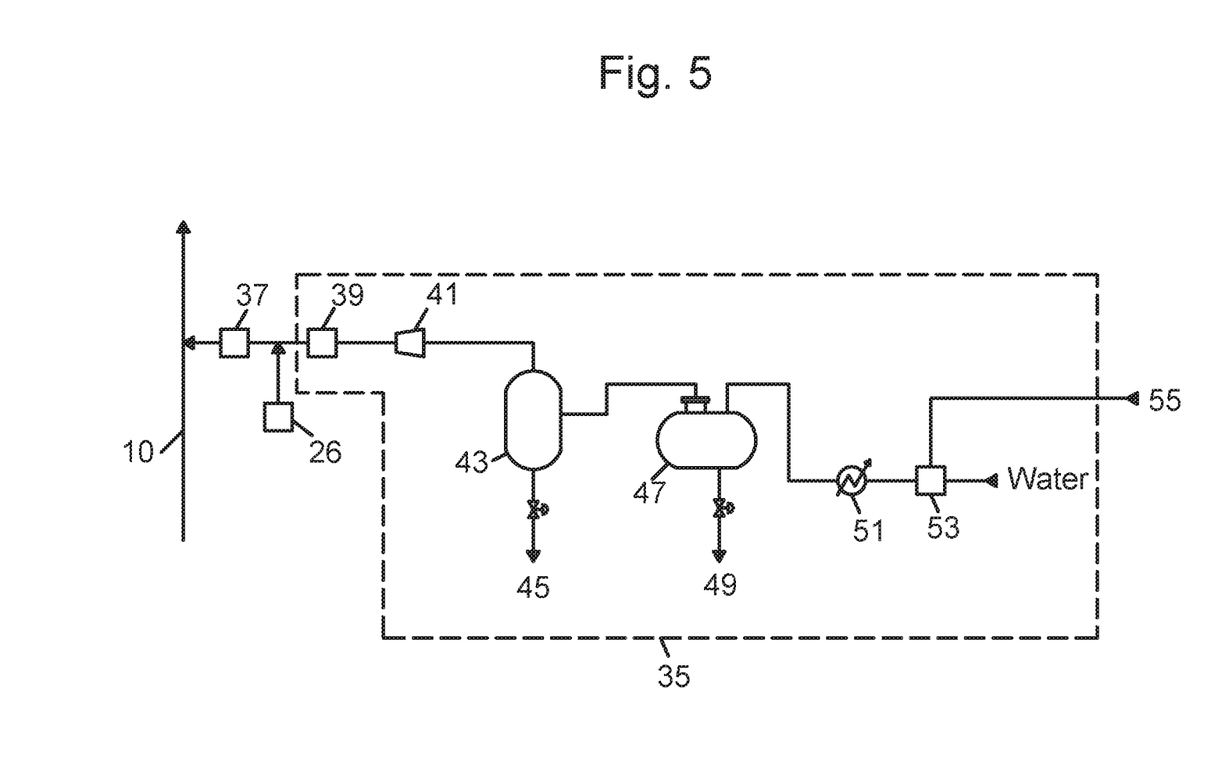
FIG. 5 is a diagram of the recycle hydrogen injector and associated components also generally shown in FIGS. 1-3 and 6.

FIG. 5 is a diagram of the recycle hydrogen injector and associated components.

A recycle hydrogen injector 35 can inject recycled hydrogen at an elevated pressure and raise pressure on the vacuum gas oil to maintain pressure in the conduit 10 between 1000 psig and 1500 psig.

The recycle hydrogen injector 35 includes a recycle nozzle 37, a recycle flow meter 39 connected to the recycle nozzle in series, a hydrogen compressor 41 connected to the recycle flow meter 39, a second stage knockout drum 43 separating out contaminated water 45, a first stage knockout drum 47 separating out contaminated water and naphtha 49, a water cooled exchanger 51, a high-pressure wash water injector 53 having a psig from 1400 psig to 1600 psig, and a recycle overhead 55 connected to the high-pressure flash drum 60 receiving high pressure recycle hydrogen and contaminants 63 separated from oil in high-pressure flash drum.

The fresh hydrogen injector 26 is also shown in this figure.

FIG. 6 shows some elements of FIGS. 1-5 which have been detailed above.

FIG. 6 shows a system 2 for producing an American Petroleum Institute Standards Group III Base Stock from vacuum gas oil.

FIG. 6 shows a conduit 10 receiving a vacuum gas oil 9 with a boiling point range from 450 degrees Fahrenehti to 1050 degrees Fahrenheit as defined by ASTM D-86.

A first heater 30 is fluidly connected to the conduit with the vacuum gas oil 9 increasing the temperature of the vacuum gas oil 9 to a temperature from 450 degrees Fahrenheit to 600 degrees F.

A first hydrogen reactor 32 with first catalyst 38a fluidly receives the vacuum gas oil 9 with increased temperature and demetallizing the vacuum gas oil forming a demetalized vacuum gas oil 133.

A pump 25 installed prior to the first heater 30, a fresh hydrogen injector 26 installed prior to the first heater 30, and a recycle hydrogen injector 35 installed prior to the first heater 30 simultaneously increase pressure on the vacuum gas oil 9 from 50 psig to a pressure from 1000 psig and up to 1500 psig by injection of hydrogen.

To achieve this increase in pressure, the fresh hydrogen injector 26 has a nozzle 37 that engages a flow control valve which is further in communication with a flow meter and a high-pressure pump and a hydrogen vaporizer for receiving liquid hydrogen from a liquid hydrogen reservoir (as shown in FIG. 5).

In this FIG. 6, a plurality of hydrogen reactors are connected in series 32, 42, 52, and 160. Each hydrogen reactor contains catalyst.

The first hydrogen reactor 32 has first catalyst 38a, the second hydrogen reactor 42 has second catalyst 38b, the third hydrogen reactor 52 has third catalyst 38c, and the fourth hydrogen reactor 160 has fourth catalyst 38d.

The liquid hourly space velocity (LHSV)$^{-1}$ through the 4 different hydrogen reactors is from 0.5 to 2.5, for saturating the heated vacuum gas oil.

The first hydrogen reactors, 32 form a demetallized vacuum oil 133, the second and third hydrogen reactors generate partially saturated heated base oils 202a and 202b.

It should be noted that each hydrogen reactor is connected to a heater respectively.

The first hydrogen reactor 32 connects to a first heater 30, a second hydrogen reactor 42 connects to a second heater 40, the third hydrogen reactor connects to a third heater 50.

A fourth heater 150 is fluidly connected to an additional hydrogen reactor 160 for increasing temperature of the partially saturated heated base oil 202b with hydrogen to a temperature from 600 degrees Fahrenheit to 800 degrees Fahrenheit, forming a fully saturated base oil 162a.

A high-pressure flash drum 60 connects to the fourth hydrogen reactor 160 forming (i) a recycle overhead 55 at a high pressure from 1000 psig to 1500 psig and (ii) a fully saturated base oil 162b, (iii) contaminants 63a, and (iv) a coproduct 64a at a high pressure from 1000 psig to 1500 psig.

A low-pressure flash drum 70 is used to removed additional contaminants 63b from the fully saturated base oil 162b producing contaminant free saturated heated base oil 182 and coproduct 64b.

A fractionation tower 90 receives contaminant free fully saturated heated base oil 182 and coproduct 64b and steam 108 to remove a light oil fraction 111 with an initial boiling point less than 600 degrees Fahrenheit while simultaneously refluxing, forming an API Standards Group III Base Stock 113 with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) between 1200 and 5000 centipoise at minus 25 degrees C. and as defined by ASTM D-5293.

FIG. 6 also depicts the identical elements from FIG. 1, namely elements 22, 80, 100, 102, 110, 107, and 109 which have already been discussed

EXAMPLE 1

A system for producing an American Petroleum Institute Standards Group III Base Stock from vacuum gas oil, can use a conduit 10 for receiving a vacuum gas oil derived from used oil with a combined boiling point range from 450 degrees Fahrenheit to 1050 degree Fahrenheit as defined by ASTM D-86.

The flow rate in the conduit can be 45 gallons a minute.

A fresh hydrogen injector 26 can continuously inject high purity hydrogen into the conduit and raise pressure in the conduit 10 to maintain between 1000 psig and 1500 psig.

The fresh hydrogen injector can raise hydrogen partial pressure.

A recycle hydrogen injector 35 recirculates hydrogen from previous cycles in the system.

The recycle hydrogen injector increases velocity of the fluid in the conduit. It increases pressure by decreasing volume as the injector injects recycled hydrogen at an elevated pressure and raises pressure to maintain pressure in the conduit 10 between 1000 psig and 1500 psig.

A first heater 30 such as a heat transfer fluid hot oil heat exchanger fluidly connected to the conduit 10 and to a first hydrogen reactor 32 is used for increasing the vacuum gas oil in temperature to 450 degrees Fahrenheit at 1000 psig to 1500 psig.

Hydrogen saturation occurs in the presence of a first catalyst in the first hydrogen reactor which can be nickel molybdenum, or cobalt supported on alumina beads. The heated vacuum gas oil is partially saturated through a plurality of hydrogen reactors each with a similar or different catalyst, connected in series having a liquid hourly space velocity (LHSV)$^{-1}$ through the hydrogen reactors of from 0.5 to 2.5, forming a partially saturated heated base oil, a coproduct, and contaminants. In some embodiments, a demetallizing catalyst can be used in the first hydrogen reactors along with the first catalyst 38a of with the nickel, cobalt or molybdenum catalyst.

A second heater 40 is fluidly connected between the first hydrogen reactor 32 and a second hydrogen reactor 42. The second heater 40 further increasing in temperature of the vacuum gas oil and the second reactor has a second catalyst 38b to further increase saturation A third heater 50 is fluidly connected to the second hydrogen reactor 42 and to a third hydrogen reactor 52 with a third catalyst 38c increasing the temperature of the vacuum gas oil to a third temperature of 600 degrees Fahrenheit at a pressure between 1000 psig and 1500 psig.

A fourth heater 150 is fluidly connected to the third hydrogen reactor 52 and to a fourth hydrogen reactor 160 with a fourth catalyst 38d, increasing temperature to a fourth temperature of 600-800 degrees Fahrenheit and forming a fully saturated heated base oil 62 with a coproduct 64 and contaminants 63a and 63b.

A liquid hourly space velocity (LHSV)$^{-1}$ is used through hydrogen reactors of from 0.5 to 2.5; forming a fully saturated heated base oil 62, a coproduct 64, and contaminants 63a and 63b.

The volume of each of the hydrogen reactors can be 250 cubic feet with a cumulative total of all reactors of 1000 cubic feet.

The heaters can be on temperature control providing constant temperature to the hydrogen reactors.

A high-pressure flash drum 60 is connected to the fourth hydrogen reactor 160 with a fourth catalyst 38d for forming (i) a recycle overhead 55 at a high pressure from 1000 psig to 1500 psig, (ii) a fully saturated base oil 62 (iii) contaminants 63a and (iii) coproduct 64 at a high pressure from 1000 psig to 1500 psig.

The coproduct 64 in this example can be a light oil fraction similar to kerosene or diesel fuel.

The contaminants can be nitrogen and sulfur.

The recycle overhead for this example can be hydrogen.

The fully saturated base oil 62 and coproduct 64 fluid is controlled to maintain a specific level of fluid in a low-pressure flash drum 70 connected to the high-pressure flash drum.

The low-pressure flash drum 70 is used in this Example, for removing all additional contaminants 63b decreasing the fully saturated heated base oil and coproduct pressure to between 40 to 60 psig.

In this Example, an additional heater 80 is fluidly connected between the low-pressure flash drum and the fractionating tower. This additional heater 80 heats the fully saturated base oil and coproduct, forming a contaminant free fully saturated heated base oil 82 having a boiling point from 600 degrees Fahrenheit to 1050 degrees Fahrenheit as determined by ASTM D-86 and coproduct 64. The additional heater is similar to the first, second and third heaters.

A fractionation tower 90 is used that receives steam 108 and the contaminant free fully saturated heated base oil 82 as well as coproduct 64

In this example a four tray, three packed bed section can be used. This is a randomly packed tower under vacuum.

The fractionation tower runs at about 2 psia continuously and can be 46 feet 9 inches feet tall. The diameter can be 5 feet 6 inches.

Steam 108 flows out the fractionation tower via a conduit and is condensed into steam condensate 109 in the condenser 110.

The coproduct 64 is pulled off the fractionation tower refluxed, cooled and cycled back into the fractionation tower which can be a light oil fraction 111.

The fractionation tower 90 receives contaminant free fully saturated heated base oil 82 and steam 108 to remove a light oil fraction 111 with an initial boiling point less than 600 degrees Fahrenheit while simultaneously refluxing a cooled light oil fraction during fractionating forming an American Petroleum Institute Standards Group III Base Stock with less than 0.03 percent sulfur, greater than 90 percent saturates and a viscosity index greater than 120 as defined by ASTM D-2270 and a viscosity range from 2 centistokes to 10 centistokes as defined by ASTM D-445 with a boiling range from 600 degrees Fahrenheit to 1050 degrees Fahrenheit as defined by ASTM D-86, and a cold crank viscosity (CCS) from 1200 centipoise to 5000 centipoise at minus 25 degrees Celsius and as defined by ASTM D-5293.

EXAMPLE 2

Example 2 involves a conduit, such as a 2 inch inner diameter feed pipe, that receives a vacuum gas oil with a boiling point range from 450 degrees Fahrenheit to 1050 degrees Fahrenheit as defined by ASTM D-86.

In this example a first heater, such as a shell and tube thermal fluid heat exchanger, is fluidly connected to the conduit and increasing temperature of the vacuum gas oil to a temperature of 450 degrees Fahrenheit, forming a heated vacuum gas oil.

A pump such as positive displacement pump, is a installed prior to the first heater.

A fresh hydrogen injector such as a hydrogen vaporizer stack for receiving a 1500 psi hydrogen from a storage tank, and a recycle hydrogen injector such as a positive displacement pump, like a diaphragm compressor are installed prior to the first heater for simultaneously increasing pressure on the heated vacuum gas oil from 50 psig to a pressure from 1000 psig and 1500 psig while injecting of hydrogen.

The fresh hydrogen injector has a 1 inch diameter nozzle (element 37 in FIG. 6) that engages a flow control valve further in communication with a flow meter such as a coriolis type flow meter, and a high-pressure pump (at a pressure of 1500 psi) and a hydrogen vaporizer stack, such as a 107 tube stack for receiving liquid hydrogen from a liquid hydrogen reservoir.

A plurality of hydrogen reactors, such as 6 hydrogen reactors, are connected in series, each to a heater.

The hydrogen reactors provide a liquid hourly space velocity $(LHSV)^{-1}$ of 1, for saturating the heated vacuum gas oil.

The first two hydrogen reactors are used to de-metallize the vacuum gas oil.

The remaining hydrogen reactors are used to form a fully saturated heated base oil.

A high-pressure flash drum, such as a 5000 gallon vertical pressure vessel is connected to the sixth hydrogen reactor and forms (i) a recycle overhead at a high pressure from 1000 psig to 1500 psig such as hydrogen and hydrogen sulfide and (ii) a fully saturated base oil, (iii) contaminants, such as ammonia and water and (iv) a coproduct at a high pressure from 1000 psig to 1500 psig such as a kerosene.

A low-pressure flash drum, such as a 2000 gallon 100 psi vessel is used to remove additional contaminants, such as methane and ethane, from the fully saturated heated base oil producing contaminant free saturated heated base oil and coproduct, such as naphtha.

A fractionation tower such as a 60 foot, 3 tray tower receives contaminant free fully saturated heated base oil and coproduct and steam to remove a light oil fraction with an initial boiling point less than 600 degrees F. while simultaneously refluxing, forming an API Standards Group III Base Stock with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) between 1200 and 5000 centipoise at minus 25 degrees C. and as defined by ASTM D-5293.

EXAMPLE 3

Example 3 involves a conduit, such as a 4 inch inner diameter feed pipe, that receives a vacuum gas oil with a boiling point range from 450 degrees Fahrenheit to 1050 degrees Fahrenheit as defined by ASTM D-86.

In this example a first heater, such as a direct fired heater, is fluidly connected to the conduit and increasing temperature of the vacuum gas oil to a temperature of 550 degrees Fahrenheit, forming a heated vacuum gas oil.

A pump such a tri-plex piston pump, is installed prior to the first heater.

A fresh hydrogen injector such as vaporizer for receiving a 1500 psi hydrogen from a storage tank, and a recycle hydrogen injector such as a positive displacement pump, like a reciprocating compressor are installed prior to the first heater for simultaneously increasing pressure on the heated vacuum gas oil from 50 psig to a pressure from 1000 psig and 1500 psig while injecting of hydrogen gas.

The fresh hydrogen injector has a 2 inch diameter nozzle (element 37 in FIG. 6) that engages a flow control valve further in communication with a flow meter such as a coriolis type flow meter, and a high-pressure pump (at a pressure of 1300 psi) and a hydrogen vaporizer stack, such as a 200 tube stack for receiving liquid hydrogen from a liquid hydrogen reservoir.

A plurality of hydrogen reactors, such as 5 hydrogen reactors, are connected in series, each to a heater.

The hydrogen reactors provide a liquid hourly space velocity $(LHSV)^{-1}$ of 0.6 for saturating the heated vacuum gas oil.

The first two hydrogen reactors are used to de-metallize the vacuum gas oil.

The remaining hydrogen reactors are used to form a fully saturated heated base oil.

A high-pressure flash drum, such as a 6000 gallon vertical pressure vessel is connected to the fifth hydrogen reactor and forms (i) a recycle overhead at a high pressure from 1000 psig to 1500 psig such as 90/10 hydrogen and hydrogen sulfide and (ii) a fully saturated base oil, (iii) contaminants, such as 15/85 ammonia and water and (iv) a coproduct at a high pressure from 1000 psig to 1500 psig such as a diesel.

A low-pressure flash drum, such as a 3000 gallon 120 psi vessel is used to remove additional contaminants, such as a 50/50 mixture of methane and ethane, from the fully saturated heated base oil producing contaminant free saturated heated base oil and coproduct, such as naphtha.

A fractionation tower such as a 100 foot, 5 tray tower receives contaminant free fully saturated heated base oil and coproduct and steam to remove a light oil fraction with an initial boiling point less than 600 degrees F. while simultaneously refluxing, forming an API Standards Group III Base Stock with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) between 1200 and 5000 centipoise at minus 25 degrees C. and as defined by ASTM D-5293.

While these embodiments have been described with emphasis on the embodiments, it should be understood that within the scope of the appended claims, the embodiments might be practiced other than as specifically described herein.

What is claimed is:

1. A system for producing an American Petroleum Institute Standards Group III Base Stock from vacuum gas oil, comprising:
   a. a conduit receiving a vacuum gas oil with a boiling point range from 450 degrees Fahrenheit to 1050 degrees Fahrenheit as defined by ASTM D-86;
   b. a first heater fluidly connected to the conduit increasing temperature of the vacuum gas oil to a temperature from 450 degrees Fahrenheit to 600 degrees Fahrenheit, forming a heated vacuum gas oil;
   c. a pump installed prior to the first heater, a fresh hydrogen injector and a recycle hydrogen injector simultaneously increasing pressure on the heated vacuum gas oil from 50 psig to a pressure from 1000 psig and 1500 psig by injection of hydrogen, wherein the fresh hydrogen injector comprises a nozzle that engages a flow control valve further in communication with a flow meter and a high-pressure pump and a hydrogen vaporizer for receiving liquid hydrogen from a liquid hydrogen reservoir;
   d. a plurality of hydrogen reactors connected in series, each to a heater, each hydrogen reactor having a liquid hourly space velocity $(LHSV)^{-1}$ from 0.5 to 2.5, for first demetallizing and heating and then further reacting and heating the heated vacuum gas oil to form a fully saturated heated base oil, wherein the saturated heated base oil with hydrogen has a temperature from 600 degrees Fahrenheit to 800 degrees Fahrenheit;
   e. a high-pressure flash drum connected to the final hydrogen reactor forming (i) a recycle overhead at a pressure from 1000 psig to 1500 psig; (ii) a fully saturated base oil, (iii) contaminants, and (iv) a coproduct at a high pressure from 1000 psig to 1500 psig;
   f. a low-pressure flash drum removing additional contaminants from the fully saturated base oil producing contaminant free saturated heated base oil and coproduct; and
   g. a fractionation tower receiving contaminant free saturated heated base oil and coproduct and steam to remove a light oil fraction with an initial boiling point less than 600 degrees F. while simultaneously refluxing, forming an API Standards Group III Base Stock with less than 0.03 percent sulfur, greater than 90 percent saturates and a viscosity index greater than 120 as defined by ASTM D-2270 and a viscosity range from 2 to 10 centistokes as defined by ASTM D-445 with a boiling range from 600 degrees F. to 1050 degrees F. as defined by ASTM D-86, and a cold crank viscosity (CCS) between 1200 and 5000 centipoise at minus 25 degrees C. and as defined by ASTM D-5293.

2. The system of claim 1, further comprising a feed effluent heat exchanger to exchange energy from the American Petroleum Institute Standards Group III Base Stock is with the feedstock vacuum gas oil reducing temperature of the American Petroleum Institute Standards Group III base stock from 500 degrees Fahrenheit to 300 degrees Fahrenheit.

3. The system of claim 2, further comprising a cooling water exchanger to receive warm American Petroleum Institute Standards Group III Base Stock from the feed effluent heat exchanger and reduces the temperature by 100 degrees Fahrenheit to 150 degrees Fahrenheit and then transfers the cooled American Petroleum Institute Standards Group III Base Stock to storage or transport.

4. The system of claim 1, further comprising a metallic catalyst installed in each of the hydrogen reactors, wherein the metallic catalyst is selected from at least one of the group consisting of: cobalt, nickel, and molybdenum.

5. The system of claim 1, wherein the recycle hydrogen injector comprises:
   a. a recycle nozzle;
   b. a recycle flow meter connected to the recycle nozzle in series;
   c. a hydrogen compressor connected to the recycle flow meter;
   d. a second stage knockout drum separating contaminated water;
   e. a first stage knockout drum separating contaminated water and naphtha;
   f. a water-cooled exchanger;
   g. a high-pressure wash water injector providing a psig from 1400 to 1600 psig receiving water; and
   h. a recycle overhead connected to the high-pressure wash water injector.

* * * * *